June 23, 1970   E. W. BIEDERMAN, JR   3,516,648
GRATE FOR VERTICAL KILN
Filed June 27, 1968
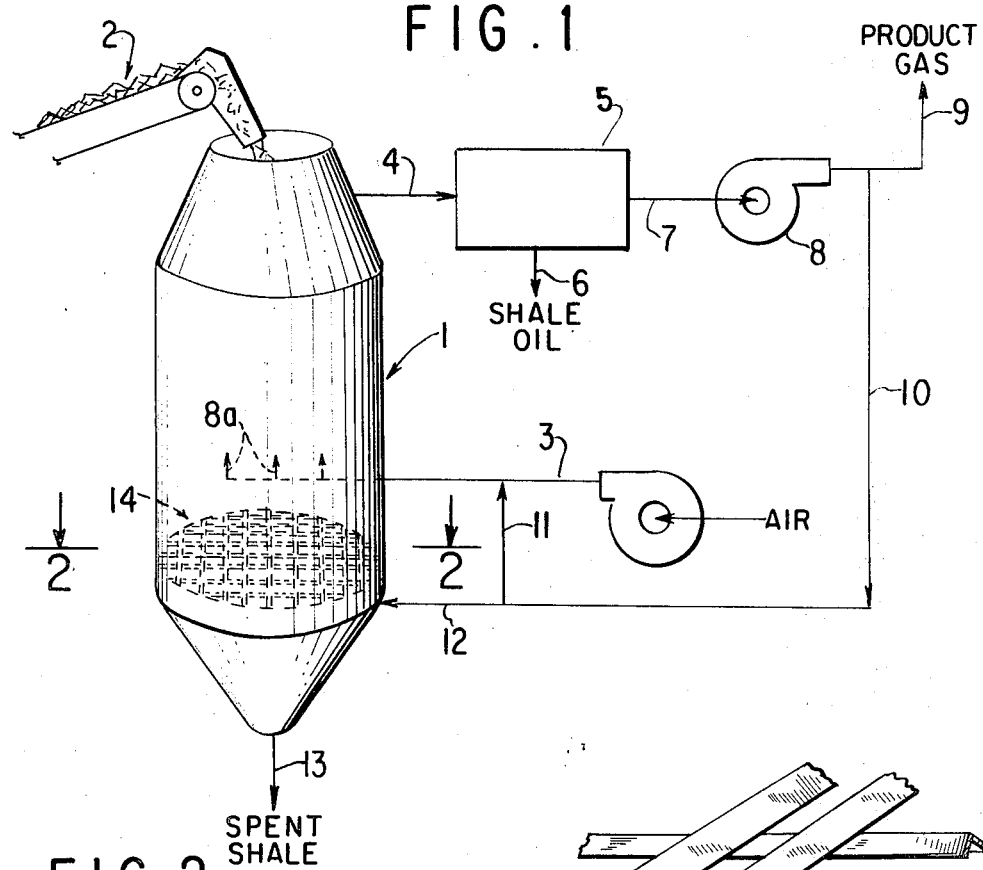
FIG.1
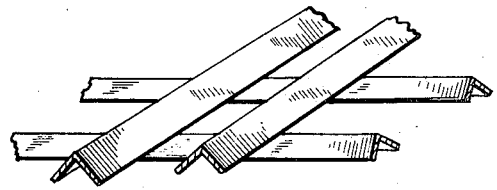
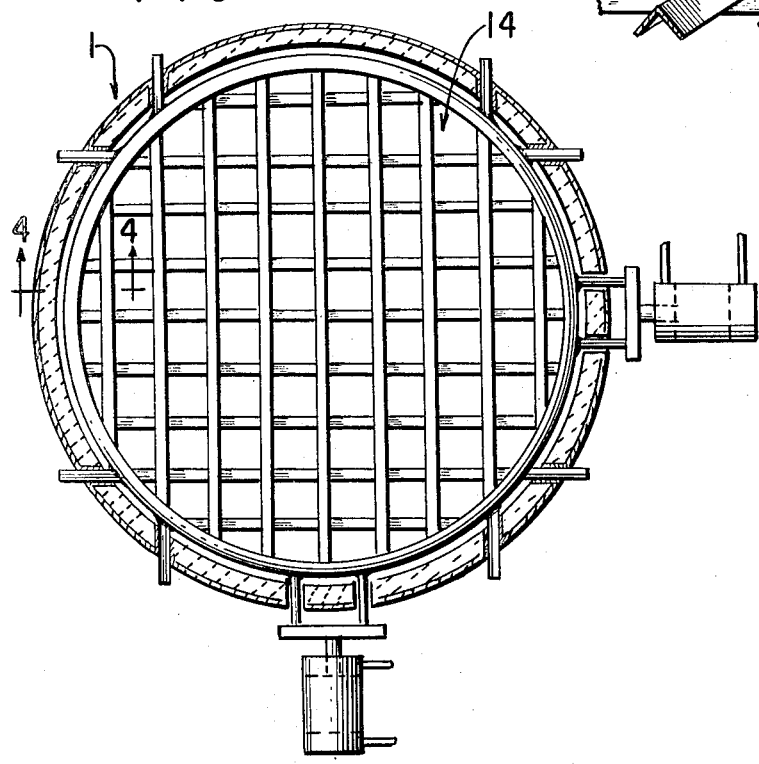
FIG.2
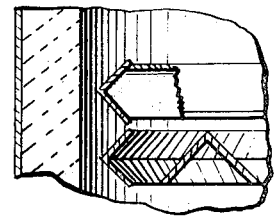
FIG.4
INVENTOR
EDWIN W BIEDERMAN, JR
BY
ATTORNEY

United States Patent Office 3,516,648
Patented June 23, 1970

3,516,648
GRATE FOR VERTICAL KILN
Edwin W. Biederman, Jr., Tulsa, Okla., assignor to Cities Service Oil Company, Tulsa, Okla., a corporation of Delaware
Filed June 27, 1968, Ser. No. 740,534
Int. Cl. F27b 1/00
U.S. Cl. 263—29          13 Claims

ABSTRACT OF THE DISCLOSURE

Two sets of piston-driven linear grates are positioned in horizontal planes in the lower portion of a vertical kiln. One linear grate is positioned above and at right angles to the other. The horizontal distance between the individual grate members will depend upon the particular solids passing through the vertical kiln, but will generally range from about 1–2" to about 24". The vertical distance between the linear grates will generally be from about ½" to about 6–8". By oscillating each linear grate by the action of pistons connected thereto, an even flow of solids across the cross-sectional area of the kiln may be achieved. The tendency for solids to flow downwardly more rapidly either at the side or at the center may thus be overcome. A more uniform treatment of solids is thus achieved, and the efficiency of retorting is enhanced.

BACKGROUND OF THE INVENTION

Field of the invention

This invention relates to a grate system for a vertical retorting kiln. More particularly, it relates to an improved grate that permits the uniform flow of solids through a vertical retorting kiln.

Description of the prior art

In the downward flow of solids through a vertical retorting kiln, a tendency exists for the solids to move at various rates in different portions of the kiln. For example, a tendency may exist for the solids to move more rapidly in the center of the kiln than along the sides thereof. This tendency is sometimes referred to in the art as the "rat-hole" effect. In vertical kilns having a very steep cone section in the lowermost portion thereof, on the other hand, the solids may tend to flow more rapidly along the sides than in the center of the kiln. This is sometimes referred to as the "mass flow" effect.

Various grate designs have been proposed in an effort to provide an even flow of solids in such vertical kilns. In U.S. Pat. 3,027,147, for example, a discharge grate having a number of hydraulic cylinders and universal support arms are disclosed that serve to move annular inverted V-bars in a circular motion. Because of its mechanical complexity, however, this device is somewhat troublesome in application and tends to become clogged.

In another proposed solution to this problem, a linear grate has been employed in conjunction with a scraper bar having a particular configuration and position under the linear grate. While some success in reducing the variation in flow rate has been achieved with this design, an essentially uniform flow rate has, nevertheless, not been achieved.

It is an object of the present invention, therefore, to provide an improved grate for vertical kilns.

It is another object of this invention to provide a grate system that permits the uniform flow of solids throughout a vertical kiln.

It is a further object of the present invention to provide a grate system capable of permitting a uniform flow of solids in a vertical kiln without undue mechanical complexity.

It is a further object of the invention to provide a grate system that facilitates the uniform treatment of solids in a vertical kiln.

It is another object of the present invention to provide a grate system that enhances the retorting efficiency of vertical kilns.

With these and other objects in mind, the present invention is hereinafter described in detail, and the novel features thereof are pointed out in the appended claims.

SUMMARY OF THE INVENTION

In accordance with the present invention, two linear grates are positioned in horizontal planes in the lower portion of a vertical kiln. The vertical distance between the linear grates will generally be from about ½ inch to about 6 or 8 inches. The individual grate members comprising each linear grate extend across the kiln in an essentially parallel configuration, the members of one such linear grate extending generally in a direction at right angles to the direction in which the members of the other linear grate extend. The two linear grates taken together, therefore, create a checkerboard effect in the lower portion of the kiln.

In order to break up aggregates of the material flowing downwardly in the kiln, the oscillation of each linear grate is accomplished by suitable mechanical means, such as by pistons connected to each grate system. A stroke of about ½ inch will generally be satisfactory for the desired degree of oscillation.

The opening between the individual members of each linear grate will depend upon the particular material being retorted, but will generally be from at least as large as the largest material being retorted to about 4 times that size. Generally, therefore, the opening or space between individual members of each linear grate will generally be in the range of from about ½ inch to about 24 inches. The individual members comprising each linear grate may conveniently be inverted V-bars extending essentially parallel across a horizontal plane in the lower portion of the kiln.

BRIEF DESCRIPTION OF THE DRAWING

The present invention is hereinafter described in further detail with particular reference to the accompanying drawings in which:

FIG. 1 represents a somewhat diagrammatic view of an oil shale retorting process in which the improved grate of the present invention may be employed;

FIG. 2 represents a cross-sectional view of the retorting kiln taken along the line 2—2 of FIG. 1;

FIG. 3 is a prospective view showing the relative position and shape of individual grate members of the linear grates of the present invention;

FIG. 4 is a cross-sectional view taken along line 4—4 of FIG. 2 and showing the relative vertical positioning of the linear grates and their respective supporting rings.

DETAILED DESCRIPTION OF THE INVENTION

As previously indicated, the present invention is intended to provide for the uniform flow of solids downwardly through a vertical retorting kiln. In the absence of such a uniform flow, the solids passing through the kiln are not subject to an even burning treatment. If a solid product is the object of the retorting operation, e.g. cement clinker, the resulting product will lack the desired uniformity of characteristics that would be more nearly achieved if the material passed through the retorting kiln at a uniform rate. When oil shale is the solid being retorted, the lack of uniformity in the solids flow rate and the consequent uneven burn of the shale may result in the absence of a uniform degree of recovery of shale oil from the shale. A loss of shale oil in the spent shale will result. As an alternative, the shale may be retorted so that a satisfactory recovery of shale oil from the more rapidly moving solids is achieved. In this instance, however, the retention time of the more slowly moving solids is unnecessarily extended, thus reducing the efficiency of the retorting operation.

To overcome these difficulties, the present invention calls for two linear grates positioned in horizontal planes in the lower portion of a vertical retorting kiln. The co-action of these grates, as further described hereafter, tends to break up aggregates of the material passing through the kiln, permits a faster solids throughput, and, perhaps most significantly, results in a more uniform flow of solids downwardly through the kiln. Thus, the solids passing through the kiln are subjected to more uniform treating conditions, and the efficiency of the retorting operation is enhanced.

The improved grate of the present invention is useful in achieving these beneficial results with respect to any solid material to be retorted in a vertical kiln. Solid materials such as oil shale, iron sinter, cement clinker, and the like may be advantageously retorted in a vertical kiln incorporating the improved grate of the present invention.

Each linear grate of the present invention comprises individual grate members extending in an essentially parallel configuration across a horizontal plane in the lower portion of the kiln. The separate linear grates are positioned with respect to each other, however, so that the individual grate members of one extend in a direction essentially at right angles to the direction in which the individual grate members of the other grate extend across the kiln. Taken together, the individual grate members of the two linear grates thus form a checkboard effect across the kiln. The individual grate members may conveniently comprise inverted V-bars, each linear grate comprising a multiplicity of such bars extending generally in a parallel fashion across the kiln. The individual inverted V-bars of the second linear grate likewise extend across the kiln in an essentially parallel configuration, the inverted V-bars of one linear grate extending generally at right angles to the inverted V-bars of the second linear grate.

The vertical distance between the two horizontally positioned linear grates is not a critical, unitary value, but will vary depending upon the particular material being treated. In order that the two linear grates may co-act so as to break up aggregates of the material being treated, the two grates should, of course, be positioned sufficiently close to one another so that a co-action between the grates may be achieved. The vertical distance between the linear grates will generally be within the range of from about ½″ to about 6–8″, although values outside this range might also be employed in some circumstances.

The horizontal distance between the individual grate members of each linear grate likewise is not a critical, unitary value but will vary depending on various factors such as the particular solids material being passed through the kiln. This distance or opening will generally range from about as long as the largest particles passing through the kiln to about four times this distance. If oil shale having pieces as long as six inches were being treated, therefore the opening or distance between the individual grate members of each linear grate might conveniently be from about six inches to about twenty-four inches. Since very small sized material having particles no larger than about ½″ may be treated in vertical kilns so the type herein considered, the opening or distance between the individual grate members may generally range from as little as about ½″ up to about 24″ or more. Openings of less than the size of the largest piece of material being treated may also be employed in the improved grate of the present invention although the possibility of blockage will become a factor as the size of the opening becomes increasingly smaller with relation to the size of the solid material passing through the grate. When the individual grate members comprise inverted V-bars, the distance between the bars as referred to above should generally be construed as referring to the distance or opening at the bottom or base of the inverted V-bars.

It will be appreciated that the individual grate members comprising each linear grate must be supported in their predetermined position in the kiln by means of some mechanical supporting means. Any suitable supporting mechanism may be employed for this purpose. For example, supporting bars to which the individual grate members are secured may be positioned across the kiln. Alternately, individual supporting rings may be positioned around the periphery of the kiln, with the individual grate members, such as inverted V-bars, attached thereto. As a less desirable alternative, each individual grate member could conceivably extend through the side wall of the kiln so as to use the side wall itself or some means outside the kiln for support.

In order to break up aggregate of the solids material being treated and to facilitate the uniform flow of such solids through the kiln, it is desirable to provide means for oscillating each linear grate. Any suitable mechanical means may be provided in order to impart the desired oscillation to the grates. This result can conviently be achieved by providing pistons to impart a horizontal movement or oscillation to each linear grate. For example, a piston may be connected to each of the linear grate supporting rings referred to above. If supporting bars extending across the kiln are provided in place of a supporting ring, the ends of such bars may likewise be connected to a piston or to a series of pistons adapted to impart the desired motion to the linear grates through their supporting means. The degree of oscillation imparted is not a critical feature of the invention, and the predetermined positions between which the linear grates are moved may be varied depending upon the particular size of the kiln, the particular configuration of the grate system employed, and the particular material being treated. Generally, however, a piston stroke of about ½″ will suffice and will supply a sufficient oscillation to the separate linear grates to produce the desired effect.

Referring now to the accompanying drawings, FIG. 1 illustrates a flow diagram for a typical gas combustion oil shale retarding process employing the present invention. A stream of crushed oil shale is fed by means of conveyer 2 to the top of an insulated, refractory-lined vertical retorting vessel 1 in which it moves downward as a continuous bed. Air from line 3, together with recycle gas from line 11, is injected at the mid-point of the kiln. Combustion takes place in the shale bed immediately above the air injection level. Some carbonaceous residue in the spent shale is consumed as fuel.

The combustion products emitted from the burning zone exchange heat with the shale entering the top of kiln 1, thus bringing the shale to retorting temperature. The combustion products then carry the distilled oil from kiln 1 as a mist through line 4 to an electrostatic precipitator 5 in which the shale oil is removed from the combustion gas stream. The shale oil thus separated is recovered through line 6. The combustion gases are discharged through line 7 by pumping means 8, and a portion thereof are recovered as product gas through line 9. The recycle portion of the combustion gas is passed through line 10, and a portion thereof is injected into the lower portion of kiln 1 through line 12 while the other portion is passed through line 11 for admixture with air from line 3 and injection into kiln 1 through injection ports 8a. Spent shale is withdrawn from the bottom of kiln 1 through line 13. The grate means of the present invention are positioned in the lower portion of the vertical kiln and are represented by the numeral 14.

The improved grate system of the present invention is shown more clearly in FIGS. 2 and 3 illustrating the checkerboard configuration of the two linear grates positioned horizontally across the vertical retorting kiln. As shown in FIG. 2 and also in FIG. 3, each linear grate comprises a multiplicity of inverted V-bars that extend across the vertical kiln in essentially horizontal planes. The individual grate members, i.e. the inverted V-bars, of each linear grate extend across the kiln in an essentially parallel configuration, with the individual grate members of one linear grate extending in a direction at right angles to the direction in which the individual grate members of the second linear grate extend. The individual grate members of each linear grate are secured to a supporting ring positioned along the inside surface of the kiln. Each supporting ring is attached to a piston adapted to provide an oscillating movement to the supporting ring and to the linear grate secured thereto. The vertical distance between the individual supporting rings and the individual grate members attached thereto are indicated in FIG. 4.

In the operation of a vertical retorting kiln including the improved grate of the present invention, each linear grate is piston driven so as to incorporate an oscillating motion during the movement of the bed of solids downwardly through the kiln. This oscillating motion imparted to the two coacting linear greates facilitates the breaking up of any aggregates of solids that may exist and thus permits a more rapid flow of solids through the kiln. As previously indicated, the improved grate of the present invention also permits and facilitates the uniform flow of solids through the vertical kiln.

Soilds are generally removed from vertical retorting kilns at a uniform rate of withdrawal. The present invention assures that the solids thus removed will have had an essentially uniform flow throughout the kiln. The retention time of the solids in the kiln will thereby be made essentially constant. Thus, variation in the degree and duration of treatment of the solids removed from the kiln will be minimized. In those instances in which a solid product is to be obtained, the present invention permits the obtaining of a more uniform product than would be obtained in the absence of such a uniform flow of solids. When a liquid constituent is to be distilled from the solids in the kiln, as in the retorting of oil shale, similar advantages are obtained by means of the present invention. A more uniform recovery of shale oil may be obtained since the even flow of shale through the kiln obviates the uneven burn of the solids that tends to occur in conventional kiln arrangements. The necessity for maintaining some solids in the kiln for an excess period of time in order to more fully recover the shale oil from the more slowly moving shale particles is thus obviated. Operating efficiencies are thus increased by the more uniform flow obtained by the relatively simple apparatus of the present invention.

The present invention overcomes both the problem of center "rat-hole" effect, in which the rate of movement of the solids is greater at the center of the kiln than at the sides, and the mass flow effect, in which the solids move more rapidly at the side than at the center of the kiln as frequently occurs in vertical kilns having a sharply angled cone section at the bottom. Heretofore, the efforts to achieve a uniform flow of solids in the kiln have either met with only partial success or have involved very elaborate, costly and complex grating systems having inherent disadvantages of operation and expense. The present invent, on the other hand, permits the achieving of a more uniform rate of flow of solids in the vertical kiln without the disadvantage of cumbersome and complex equipment. To the contrary, the present invention provides a relatively simple and problem-free structure that is both low in initial cost and comparatively free of operational difficulties. The present invention, therefore, provides a significant contribution to the vertical kiln retorting art that permits the uniform treatment of solids in a vertical retorting kiln with a resultant increase in retorting efficiency and an improved recovery of the desired products therefrom.

The present invention has been described herein with reference to particular embodiments thereof. It will be appreciated by those skilled in the art, however, that various changes and modifications can be made therein without departing from the scope of the invention as set forth in the appended claims.

Therefore, I claim:

1. An improved grate system for a vertical retorting kiln comprising:
   (a) a first linear grate extending across the kiln in an essentially horizontal plane in the lower portion thereof;
   (b) a second linear grate extending across the kiln in an essentially horizontal plane below that of said first grate means and at right angles to the direction in which said first linear grate extends;
   (c) mechanical means for oscillating each grate,
   whereby the tendency for solids to move through the kiln at a different rate at the sides than at the center may be overcome and an essentially uniform flow of solids throughout the kiln may thus be maintained.

2. The apparatus of claim 1 in which said first and second linear grates each comprise inverted V-bars extending essentially parallel to one another in said horizontal planes in the lower portion of the kiln.

3. The apparatus of claim 2 in which the horizontal distance between the individual inverted V-bars comprising each grate is from ½" to about 24" measured at the base of said inverted V-bars.

4. The apparatus of claim 2 and including mechanical supporting means for maintaining the inverted V-bars of each linear grate in the kiln.

5. The apparatus of claim 4 in which the supporting means comprises supporting rings to which said inverted V-bars are secured.

6. The apparatus of claim 1 in which said mechanical means for oscillating each linear grate comprises piston means connected to said supporting means and adapted to cause movement of said supporting means between predetermined positions, thus causing the desired oscillation of said linear grates.

7. The apparatus of claim 6 in which the distance between said predetermined positions is approximately ½".

8. The apparatus of claim 1 in which the vertical distance between said first and second linear grates is from about ½" to about 8".

9. The apparatus of claim 8 in which the vertical distance between said grates is about 6".

10. The apparatus of claim 1 in which the opening between the individual members of each linear grate is at least as long as the largest material to be treated but not more than about four times as large as the largest material to be treated in said vertical kiln.

11. The apparatus of claim 10 in which said opening is from about ½" to about 24".

12. The apparatus of claim 11 in which said opening is from about 6" to about 24".

13. The apparatus of claim 11 in which said first and second linear grates each comprise inverted V-bars extending essentially parallel in said horizontal planes in the lower portion of the kiln and including mechanical supporting means for maintaining the inverted V-bars of each linear grate in the desired position in the kiln, the mechanical means for oscillating each linear grate comprising piston means secured to said supporting means and adapted so as to cause the movement of said supporting means between predetermined position, thus causing the desired oscillation of each of said linear grates, the vertical distance between said linear grates being from about ½" to about 8".

References Cited

UNITED STATES PATENTS 2,044,628   6/1936   O'Toole _____ 263—31 X
2,573,492   10/1951  Richardson.

JOHN J. CAMBY, Primary Examiner

U.S. Cl. X.R.

214—18